(12) United States Patent
Allen

(10) Patent No.: US 6,574,915 B1
(45) Date of Patent: Jun. 10, 2003

(54) INSECT CAPTURING DEVICE

(76) Inventor: Anthony Allen, The Mill House, Clondulane, Fermoy, County Cork (IE)

(*) Notice: Subject to any disclaimer, the term of this patent is extended or adjusted under 35 U.S.C. 154(b) by 0 days.

(21) Appl. No.: 09/709,464

(22) Filed: Nov. 13, 2000

Related U.S. Application Data

(63) Continuation-in-part of application No. PCT/IE99/00032, filed on May 7, 1999.

(30) Foreign Application Priority Data

| May 12, 1998 | (IE) | ............................................. S980362 |
| Aug. 31, 1998 | (IE) | ............................................. S980700 |
| Oct. 24, 2000 | (IE) | ......................................... S2000 0853 |

(51) Int. Cl.$^7$ ................................................ A01M 3/00
(52) U.S. Cl. ........................... 43/134; 43/107; 43/110; 294/19.1
(58) Field of Search ......................... 43/110, 133, 134, 43/135, 111, 137, 121; 294/19.1, 66.1, 86.26, 86.28, 1.4, 8.5, 19.2–19.3

(56) References Cited

U.S. PATENT DOCUMENTS

| 798,825 | A | * | 9/1905 | Petersen ...................... 43/135 |
| 800,029 | A | * | 9/1905 | Terletzky ...................... 43/134 |
| 959,925 | A | * | 5/1910 | Evans ........................... 43/134 |
| 3,208,786 | A | * | 9/1965 | Eddleman ................... 294/19.3 |
| 3,965,608 | A | | 6/1976 | Schuman ..................... 43/110 |
| 4,225,169 | A | * | 9/1980 | DeToma ...................... 294/1.4 |
| 4,324,062 | A | | 4/1982 | Schneider .................... 43/110 |
| 4,382,309 | A | * | 5/1983 | Collis ......................... 15/167.2 |
| 4,631,858 | A | | 12/1986 | Kahle .......................... 43/134 |
| 4,817,330 | A | | 4/1989 | Fahringer .................... 43/133 |
| 4,995,661 | A | * | 2/1991 | Aurness et al. .............. 294/1.4 |
| 5,185,902 | A | * | 2/1993 | Fong ........................... 15/105 |
| 5,207,018 | A | | 5/1993 | Reaver et al. ................ 43/137 |
| 5,467,495 | A | * | 11/1995 | Boland et al. ................. 15/28 |
| 5,537,777 | A | | 7/1996 | Geeting ....................... 43/134 |
| 5,586,407 | A | | 12/1996 | Raymond .................... 43/137 |
| 6,196,235 | B1 | * | 3/2001 | Kim ........................... 132/148 |
| 6,279,262 | B1 | * | 8/2001 | Walkemeyer ................ 43/134 |

* cited by examiner

Primary Examiner—Charles T. Jordan
Assistant Examiner—Tara M Golba
(74) Attorney, Agent, or Firm—Jacobson Holman PLLC

(57) ABSTRACT

An insect capturing device including a head having bristles which are arranged in concentric rings. A handle has a trigger which allows a user to move the bristles between a diverged position and a converged position in which an insect is entrapped without being injured. The device may then be carried outdoors and the bristles again moved to the diverged position so that the insect is released harmlessly.

13 Claims, 5 Drawing Sheets

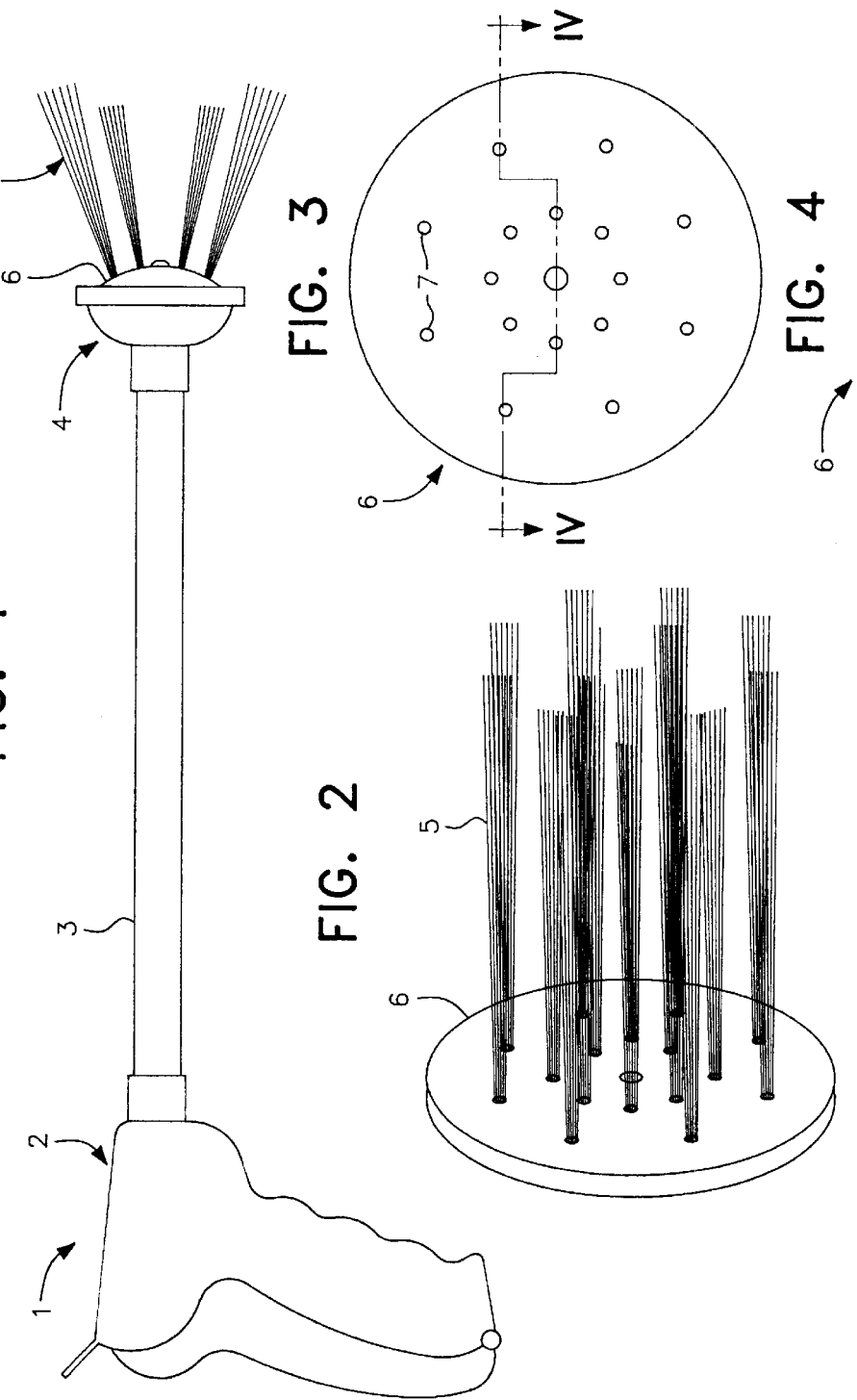

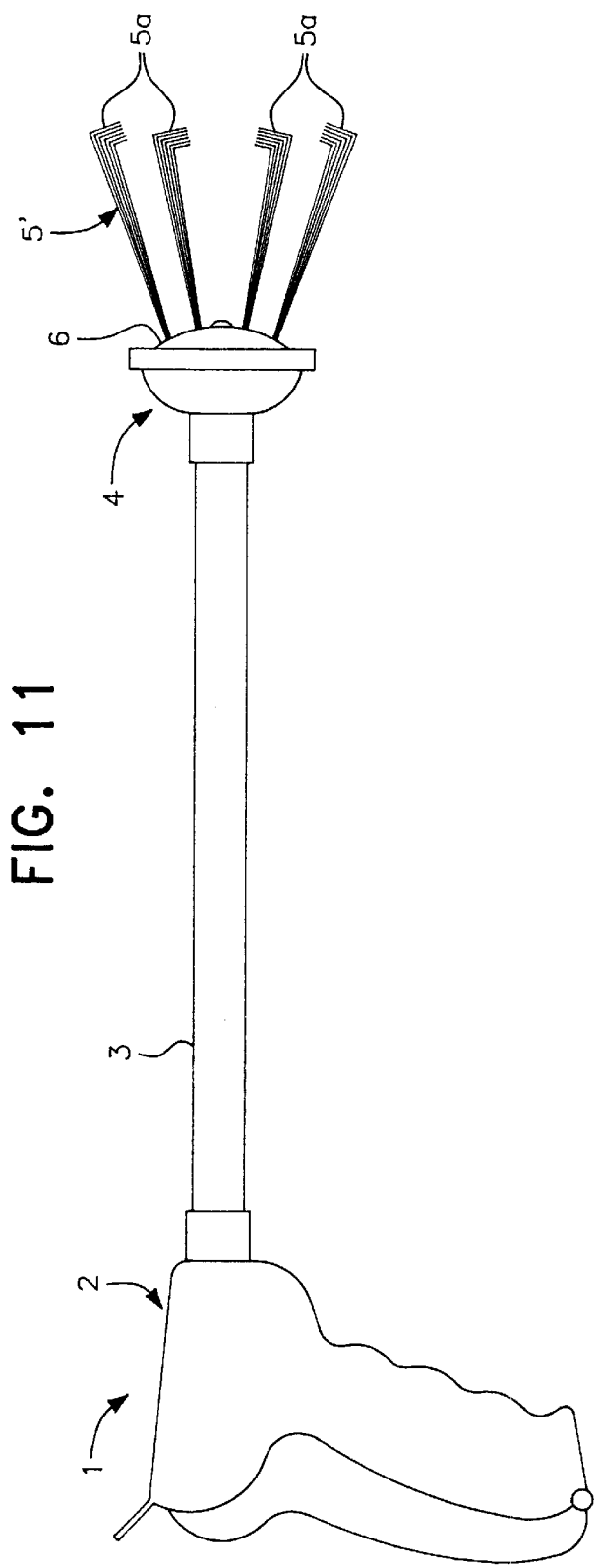

INSECT CAPTURING DEVICE

This is a Continuation-in-Part of PCT International Application No. PCT/IE99/00032, filed May 7, 1999.

FIELD OF THE INVENTION

The invention relates to capture of insects so that they may be removed from a building and released alive outdoors.

BACKGROUND OF THE INVENTION

Many people regard the presence of insects such as spiders inside a building as a nuisance. However, many such people do not wish to kill the insect and would prefer to have a convenient and simple way of disposing of the insect without killing it.

This problem has existed for many years and several attempts have been made at providing an insect capturing device to do the task. One type of such device is based on the principle of using suction to pull insects into a chamber. For example, in U.S. Pat. No. 3,965,608 (Schuman) a hand-held suction device is described. A manually-operated piston pump creates a suction and a trigger-actuated shutter valve controls suction at a nozzle. Check valves may be included for strengthening a stored vacuum.

U.S. Pat. No. 4,631,858 (Kahle) describes a device which operates on a similar principle. The open end of a tube is held near an insect, and a piston is released to cause a vacuum so that the insect is drawn into the chamber.

U.S. Pat. No. 4,817,330 (Fahringer) also describes a device which operates on this principle. This device includes a bellows which creates a vacuum when it is squeezed. A conduit connects the bellows with a trap chamber and a screen is mounted in the conduit.

U.S. Pat. No. 5,537,777 (Geeting) describes a device having a handle with a compression chamber at one end. A soft head is attached at the end of a shaft. The soft head is drawn into a compression chamber so that it wraps around the insect as the head is being compressed.

The devices which operate on this principle appear to be quite complex and so therefore would be expensive and not amenable to widespread use. Another very important aspect is that the device appears to exert considerable force on an insect and parts of the devices such as screens in trap chambers would appear to at least injure the insect, if not kill it.

Another approach is based on the principle of controlling a trap dolor so that an insect is trapped within a chamber. For example, in U.S. Pat. No. 4,324,062 (Schneider) a tubular housing has a movable trap door at either end. One end is shaped for use in corners, and the other end is flat for use against walls etc. In U.S. Pat. No. 5,207,018 (Reaver) a device is described which comprises a flexible handle having a transparent rigid housing. The housing has a large aperture through which an insect is placed. A pair of parallel channels extend along opposite sides of the compartment aperture and they are arranged to support a front end of a mesh closure member.

These devices would appear to provide a lesser chance of injuring or killing the insect. However, it appears that they are difficult to operate and are complex.

There is therefore a need for an insect capturing device which is simpler to operate so that an insect is captured in a convenient manner and is not injured or killed.

There is also a need for such a device which is of simple and inexpensive construction.

SUMMARY OF THE INVENTION

According to the invention, there is provided an insect capturing device comprising a user handle and an insect capturing head, characterised in that, the head comprises a plurality of bristles, and the device comprises an actuator comprising means for causing the bristles to move to surround and capture an insect.

Thus, the invention provides for insect capturing in a simple and convenient manner, using components (namely bristles) which have been available for many years.

Preferably, the actuator comprises means for causing the bristles to converge.

In one embodiment, the bristles are arranged in a ring.

Preferably, the head comprises a plurality of tufts of bristles arranged in a ring.

In one embodiment, the bristles are arranged in two or more concentric rings.

Preferably, the bristles of an outer ring are longer than those of an inner ring.

In one embodiment, the rings each comprise a plurality of tufts of bristles, and the tufts of adjacent rings are mounted in a mutually offset configuration.

In another embodiment, the actuator comprises a diaphragm supporting the bristles and means for moving the diaphragm between a convex position at which the bristles (5) diverge and a concave position at which the bristles converge. This is a very simple and effective way of moving bristles to entrap an insect without killing it.

Preferably, said means for moving the diaphragm comprises a rod connected at one end to the diaphragm and at the other end to a trigger mechanism at the handle.

In one embodiment, the trigger mechanism comprises a front fixed handle part (10) and a rear trigger connected to the rod.

Preferably, the actuator further comprises a spring mounted to bias the bristles to a converged state.

In one embodiment, the handle is connected to the head by an elongate rod.

BRIEF DESCRIPTION OF THE DRAWINGS

The invention will be more clearly understood from the following description of some embodiments thereof, given by way of example only with reference to the accompanying drawings in which:

FIG. 1 is a side view of an insect capturing device of the invention;

FIG. 2 is a more detailed perspective view showing part of a head of the device;

FIG. 3 is a front view of a diaphragm of the device;

FIG. 4 is a cross-sectional view in the direction of the arrows IV—IV of FIG. 3;

FIG. 11 is a side view of an insect capturing device having inwardly turned bristles having an L-shape end.

DETAILED DESCRIPTION OF THE PREFERRED EMBODIMENTS

Figure 5:
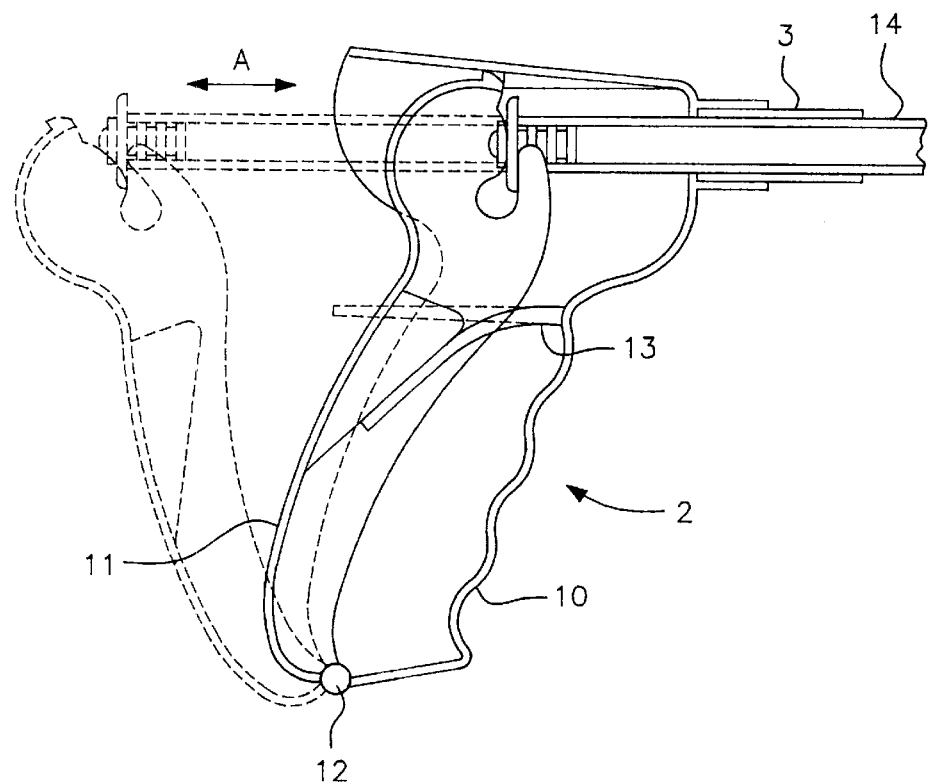
FIG. 5 is a diagrammatic side view showing a handle of the device.

Referring to the drawings, and initially to FIGS. 1 to 5 there is shorn an insect capturing device 1 of the invention. The device 1 comprises a handle 2 connected to an elongate rod 3, the other end of which is connected to a head 4. The head 4 comprises tufts of bristles 5 extending from a diaphragm 6.

As shown in FIGS. 2 and 3, the bristles 5 are arranged in two concentric rings in which the tufts are offset. Also, it will be apparent from FIG. 2 that the bristles of the outer ring are longer by approximately 8 mm than those of the inner ring. The length of the bristles in the inner ring is 92 mm and the length of those in the outer ring is 100 mm.

Referring particularly to FIG. 5, the handle 2 comprises a fixed handle part 10 which is pivotally connected to a trigger 11 by a pivot joint 12. The fixed handle part 10 comprises a leaf spring 13 against which the trigger 11 presses in an action indicated by the arrow A and the interrupted lines of FIG. 5. The trigger 11 presses against a rod 14 within the tube 3 against the action of the spring 13.

Figure 6:
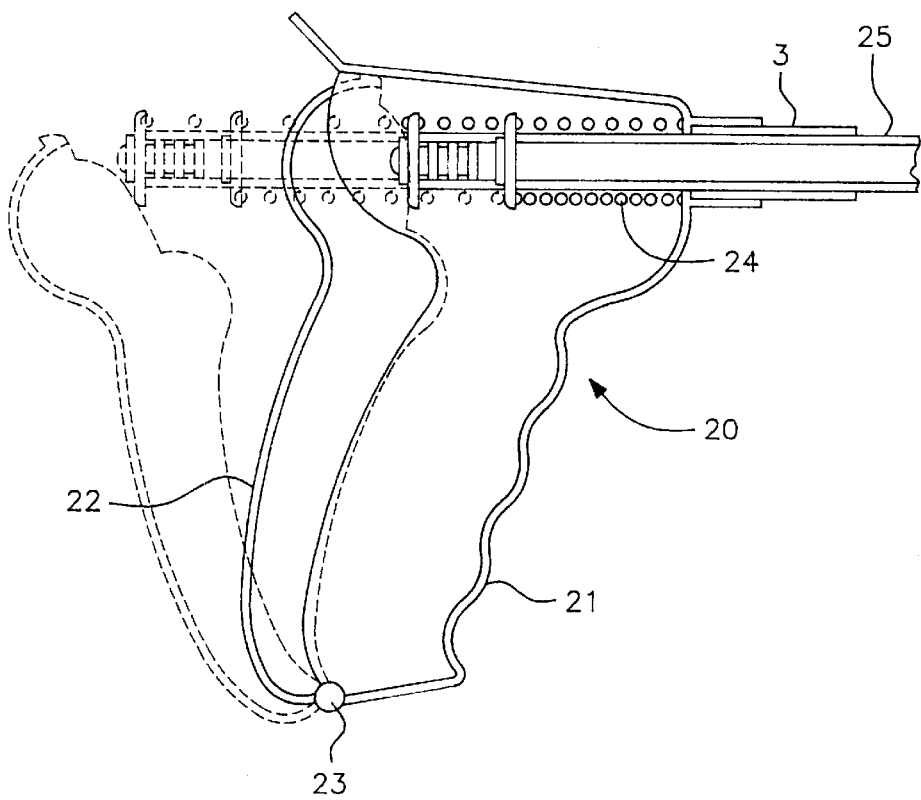
FIG. 6 is a diagrammatic side view showing an alternative construction of handle.

Referring to FIG. 6, an alternative construction of head, indicated generally by the numeral 20 is illustrated. In this embodiment, a fixed handle part 21 is connected to a trigger 22 at a pivot joint 23. The trigger 22 is biassed rearwardly by coil spring 24 around a rod 25. In the embodiments of both FIGS. 5 and 6 the rod is urged rearwardly by the action of the relevant spring 13 or 24.

Figure 7:
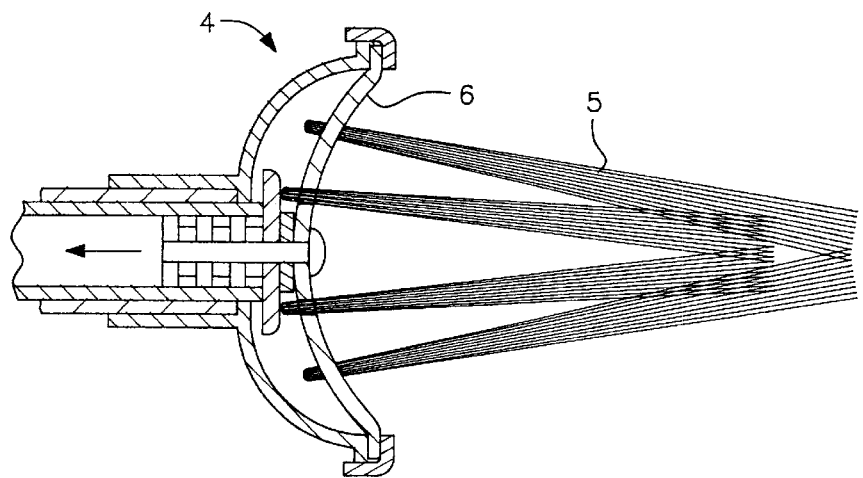
FIGS. 7 and 8 are diagrammatic cross-sectional side views showing the head of the device in different positions.
Figure 8:
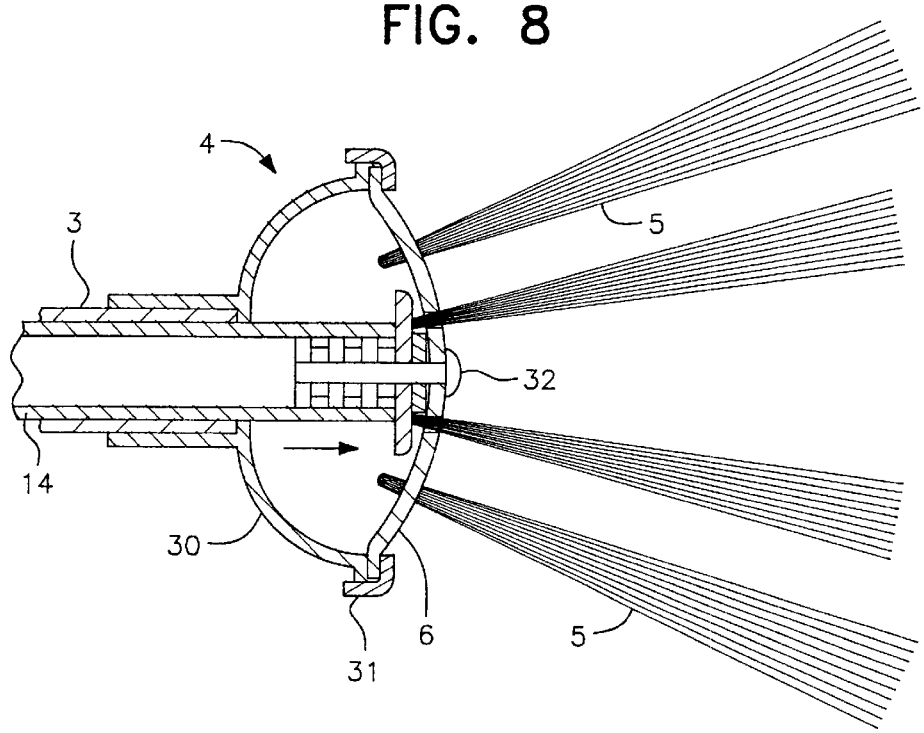

Referring now to FIGS. 7 and 8, the manner in which movement of the bristles 5 is controlled is now described. FIGS. 7 and 8 also illustrate the head 4 in more detail. It comprises a domed casing 30 and a sealing ring 31 of plastic material which supports the diaphragm 6. The rod 14 is connected to the diaphragm 6 by a fastener 32. The diaphragm 6 is flexible and its default position is shown in FIG. 7. This default position is caused by the action of the spring 13 which urges the trigger 11 and the rod 14 to a rear extremity shown by interrupted lines in FIG. 5. At this position, the diaphragm 6 is concave and the bristles 5 converge. The diaphragm 6 may be moved to a convex position when the user pushes the trigger 11 forwardly against the action of the spring 13.

Figure 9:
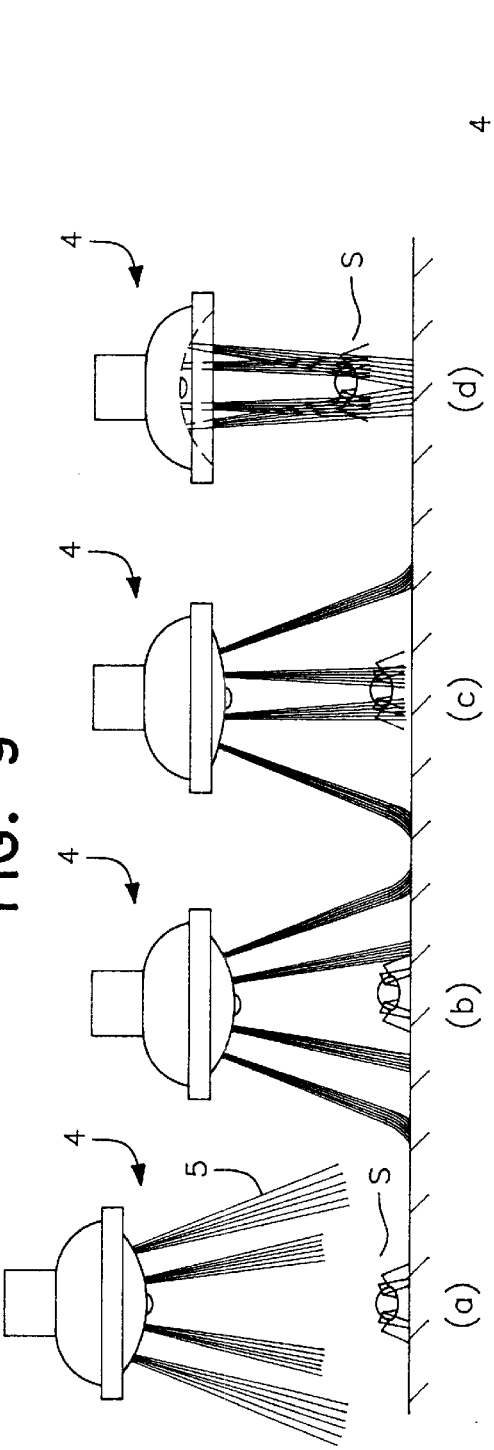
FIGS. 9(a) to 9(d) are a sequence of diagrams showing the manner in which an insect is captured.
Figure 10:
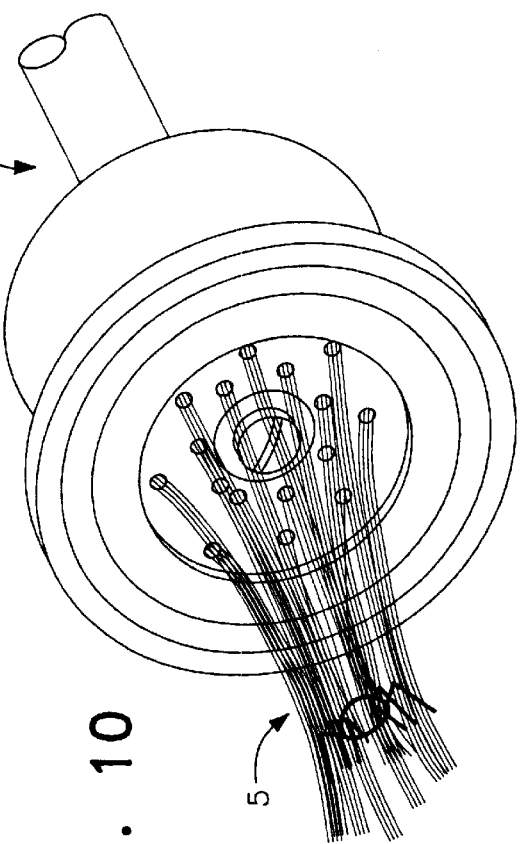
FIG. 10 is a perspective view showing the head of the device with a captured insect.

In operation, referring to FIGS. 9 and 10, the user holds the device 1 at the handle 2 and presses the trigger 11 forwardly against the action of the spring 13. This causes the bristles 5 to diverge, as shown in FIGS. 8 and 9(a). The head 4 is then moved so that the bristles 5 surround the insect (in this illustration a spider S) as shown in FIG. 9(a).

As shown in FIG. 9(c), the user then gradually releases pressure at the handle so that the spring 13 causes the rod 14 to move and therefore causes the diaphragm 6 to move towards the concave position. This causes the bristles 5 to converge. Because the bristles 5 press against the surface at which the spider S is located, the inner bristles are free to converge firstly, the outer bristles being held against the surface. Therefore, the inner bristles surround and grip the insect in a manner whereby the insect is trapped but is not injured. The inner bristles also tend to lift the spider S to some extent. Subsequently, as shown in FIG. 9(d), the outer bristles 5 converge to surround the spider S to provide a more comprehensive entrapment both around and below the spider S. The final position is shown most clearly in FIG. 10. It has been found that this action does not injure the insect. The bristles are strong enough to grip the insect but are resilient enough not to injure it.

The user then carries the device 1 outdoors and again presses the trigger 11. This causes the bristles 5 to diverge and thus release the insect harmlessly.

It will be appreciated that the invention provides an insect capturing device which is much simpler than has heretofore been the case. Importantly, the device uses simple components which have been available for many years. Therefore it may be produced using conventional production technologies.

Also, the device is much less likely to injure or kill an insect than the prior art devices. A still further advantage is that the device is much easier to operate. Only simple positioning and triggering actions are required. Another advantage is that the device may be easily used in a variety of locations such as in tight corners or on open surfaces.

The invention is not limited to the embodiments described, but may be varied in construction and detail within the scope of the claims. For example, different bristle configurations may be used which provide entrapment of the insect. Also, it is not essential that the bristles converge to capture an insect. For example, the bristles may move laterally on arcuate supports which move in a radial direction. However, the converging action is particularly effective.

In one embodiment, the bristles 5' are turned inwardly at their ends to have an L-shape as shown in FIG. 11. The turned-in portion 5a is directed in the direction in which the bristles move to surround an insect. For example, where the bristles are arranged in a ring, the ends of at least some bristles are directed radially inwards. The bristles thus provide more comprehensive enclosure of an insect to prevent it from dropping out. Preferably, in this embodiment the bristles are turned inwardly at approximately 90°. Where the bristles are arranged in concentric rings, the turned-in bristles are preferably in an outer ring.

What is claimed is:

1. An insect capturing device comprising
   a user handle and an insect capturing head,
   the head including a plurality of tufts of bristles arranged in a ring, and
   an actuator causing the bristles to move to surround and capture an insect in contact with the bristles.

2. A device as claimed in claim 1, wherein the actuator comprises means for causing the bristles to converge.

3. A device as claimed in claim 1, wherein the actuator further comprises a spring mounted to bias the bristles to a converged state.

4. A device as claimed in claim 1, wherein the handle is connected to the head by an elongate rod.

5. A device as claimed in claim 1, wherein the bristles are turned at an angle of approximately 90°.

6. An insect capturing device comprising
   a user handle and an insect capturing head,
   the head including a plurality of bristles, and
   an actuator causing the bristles to move to surround and capture an insect,
   said plurality of bristles being arranged in an outer pattern of bristles and an inner pattern of bristles, with the outer pattern of bristles being longer in length than the inner pattern of bristles.

7. An insect capturing device comprising
   a user handle and an insect capturing head,
   the head including a plurality of bristles, and
   an actuator causing the bristles to move to surround and capture an insect,
   the actuator including a diaphragm supporting the bristles and the diaphragm being movable between a convex position at which the bristles diverge and a concave position at which the bristles converge.

8. An insect capturing device comprising
a user handle and an insect capturing head,
the head including a plurality of bristles arranged in two or more concentric rings, and
an actuator causing the bristles to move to surround and capture an insect in contact with the bristles.

9. An insect capturing device comprising
a user handle and an insect capturing head,
the head including a plurality of bristles arranged in two or more concentric rings and bristles of an outer ring are longer then bristles of an inner ring, and
an actuator causing the bristles to move to surround and capture an insect in contact with the bristles.

10. An insect capturing device comprising
a user handle and an insect capturing head,
the head including a plurality of tufts of bristles arranged in two or more concentric rings and the tufts of adjacent rings being mounted in mutually offset configuration, and
an actuator causing the bristles to move to surround and capture an insect in contact with the bristles.

11. An insect capturing device comprising
a user handle and an insect capturing head,
the head including a plurality of bristles, and
an actuator causing the bristles to move to surround and capture an insect in contact with the bristles, the actuator including means for causing the bristles to converge, said means including a diaphragm supporting the bristles and means for moving the diaphragm between a convex position at which the bristles diverge and a concave position at which the bristles converge, said means for moving the diaphragm including a rod connected at one end to the diaphragm and at the other end to a trigger mechanism at the handle.

12. An insect capturing device comprising
a user handle and an insect capturing head,
the head including a plurality of bristles, and
an actuator causing the bristles to move to surround and capture an insect in contact with the bristles, the actuator including means for causing the bristles to converge, said means including a diaphragm supporting the bristles and means for moving the diaphragm between a convex position at which the bristles diverge and a concave position at which the bristles converge, said means for moving the diaphragm including a rod connected at one end to the diaphragm and at the other end to a trigger mechanism at the handle, and said trigger mechanism including a front fixed handle part and a rear trigger connected to the rod.

13. An insect capturing device comprising
a user handle and an insect capturing head,
the head including a plurality of bristles, and
an actuator causing the bristles to move to surround and capture an insect in contact with the bristles, and at least some of the bristles being turned at their ends to have a substantially L-shape and a direction of the ends of said bristles being that of movement to surround an insect, the bristles being mounted in a plurality of concentric rings and bristles of an outer ring being turned at their ends.

* * * * *